Oct. 12, 1965 S. W. WAND ETAL 3,211,601
CORED STRUCTURAL PANEL
Filed June 3, 1963 2 Sheets-Sheet 1

INVENTORS.
STANLEY W. WAND
CHARLES B. KURZ
BY Leonard H. King
ATTORNEY

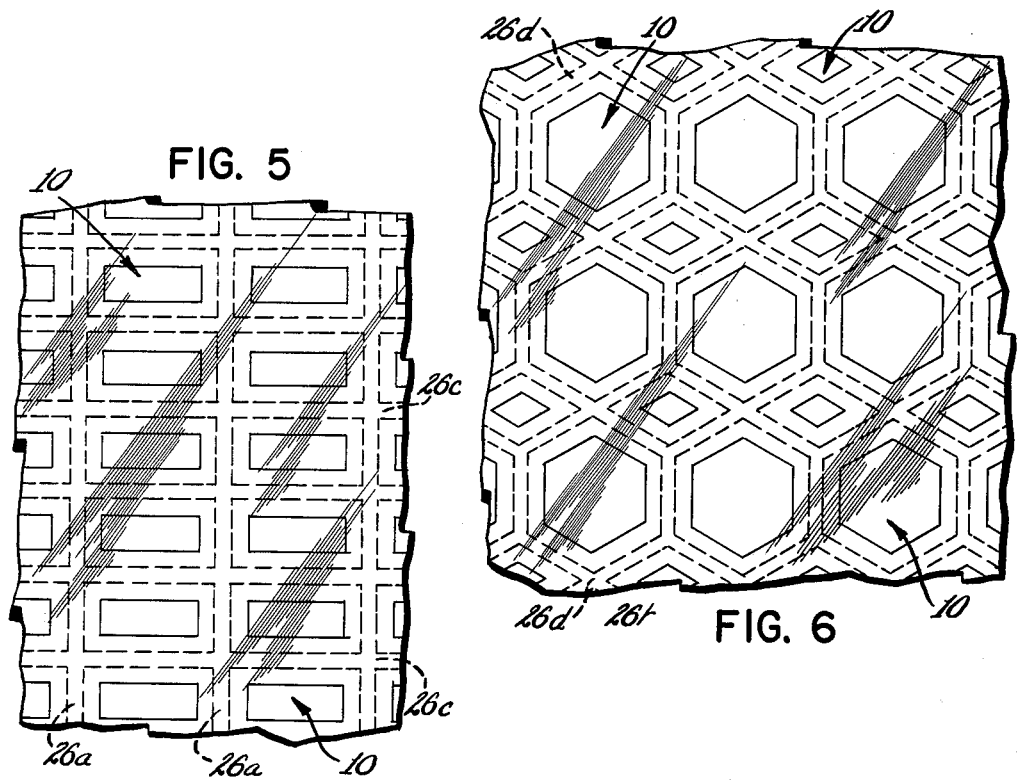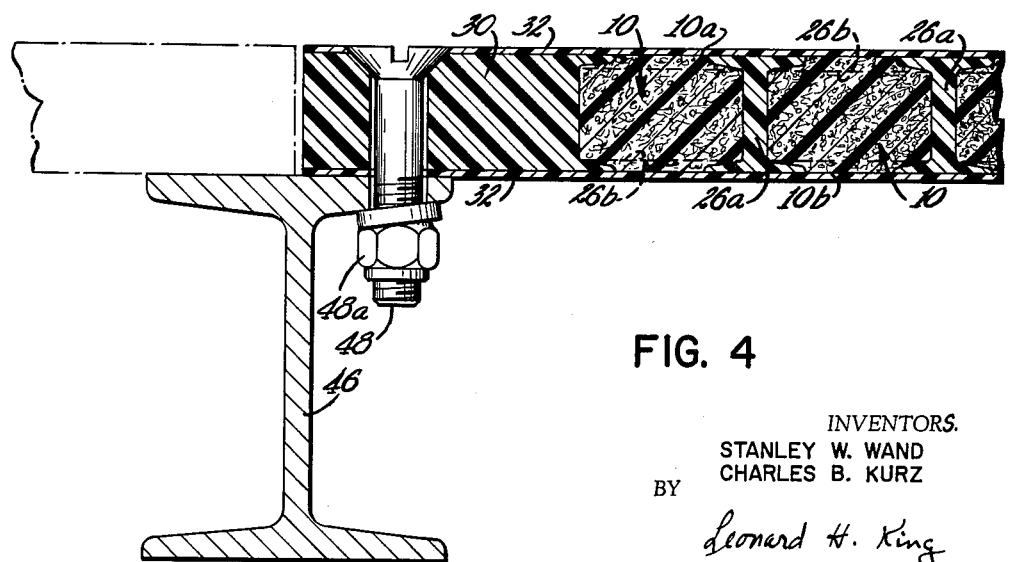

United States Patent Office 3,211,601
Patented Oct. 12, 1965

3,211,601
CORED STRUCTURAL PANEL
Stanley W. Wand, New York, and Charles B. Kurz, West Islip, N.Y., assignors to Koppers Company, Inc., a corporation of Delaware
Filed June 3, 1963, Ser. No. 285,044
6 Claims. (Cl. 156—257)

This invention relates to panels of the sandwich type including those of honeycomb type, and more particularly to such panels having a relatively low density core and the method of fabricating such panels and cores.

Honeycomb panels generally comprise thin metal, paper or plastic parallel facing sheets separated by vertical metal, paper or plastic ribs which are in the form of a hexagon to define cells much like the honeycomb of the beehive. The core and facing sheets are bonded together to form an integrated panel. The gage of the facing sheets, as well as the gage and size of the cells, are among the variables that determine the mechanical properties of the completed panel. Assuming the use of the most advantageous set of variables for a given application, there still remains one major difficulty inherent in the geometry of the sandwiched cells, viz, only the relatively thin edges of the cell wall are available for bonding to the facing sheets. Where economy of weight is a primary consideration, dictating the use of a core of a relatively low density, the strength of the bond becomes a limiting factor. Core density refers to the ratio of weight of the cell walls to the total volume occupied by the cell structure. Typical applications for the product of this invention are as a bulkhead or deck for aircraft use, paneling in the architectural field, and as any structural lightweigh load carrying member.

The present invention permits a selection of core densities over a wide range suitable for various types of appplication. More importantly, the present invention provides a 10 to 1 increase in the bonding area compared with the honeycomb sandwich panels in the prior art of the same core density, consequently a higher shear strength for a comparable density. This is accomplished primarily by the novel method of fabrication of the article of the present invention.

Briefly stated, one embodiment of the present invention comprises the casting of a grid of reinforcing ribs of relatively dense plastic in a lightweight foam plastic member. Prior to casting the ribs, the foam is machined with a routing tool to form a pattern of grooves which intersect at an angle. The routing tool is made to cut a groove which, in cross section, resembles an H-beam or an I-beam having top and bottom parallel flanges joined by a web normal to the flanges. The gooves are machined to a depth less than the total thickness of the foam member, the grooves then being filled with a fluid plastic of relatively high density. After curing, the ungrooved face of the core member is removed by suitable means and the pour side is trued, the net result being a grid or network of relatively dense plastic in intimate contact with interstices of foam plastic. Facing sheets are bonded with suitable adhesive to each side of the true core, the bonding surface consisting of the trued flanges of the plastic H- or I-beams. A preferred facing sheet is a resin-bonded laminate of glass fibers. For optimum rigidity the glass fibers should run in more than one direction. In this type of fabriction the bonding area at each facing sheet is made to constitute between 30 and 70 percent of the actual area, the percentage being dependent upon the design of the particular panel for the required usage. In contrast, prior art honeycomb sandwich panels of the same core density have a bonding area which is between 3 and 6 percent of the total area. The present invention results in a more rigid sandwich panel for a given density, assuring better performance under stress and a longer usable life. This evolves primarily from the 10 to 1 increase in bond area of the present invention compared to prior art.

Prior to application of the facing sheets any desired area of the core, such as the periphery, may be fabricated from a dense plastic which will withstand compression forces without deformation. After such an edging, for example, is added, the core and edging are trued on both major surfaces, the facing sheets are secured thereto, and the panel is cut to final size. The dense plastic edges will not crush when bolts or other fastening devices are used to secure the panel to its supporting structure.

Accordingly, it is an object of the present invention to provide a honeycomb sandwich core of improved design wherein the bonding surface of the core can be made 30 to 70 percent of the total surface of said core without a corresponding core density.

A further object of the invention is to provide a honeycomb sandwich core having a high ratio of strength vs. weight for a given volume.

An addiitonal object is to provide a method of fabricating a honeycomb sandwich core which can be accomplished economically and with relatively simple equipment.

These and other objects and advantages of the present invention will, in part, be pointed out specifically and will, in part become apparent from the following detailed description of the invention, taken in conjunction with the accompanying drawing which forms an integral part thereof.

In the various figures of the drawing like reference characters designate like parts.

In the drawings:

FIG. 4 is a fragmentary sectional elevation of a typical panel having a densified edge, together with cooperating elements.

FIGS. 5 and 6 illustrate alternative rib configurations.

Figure 1A:
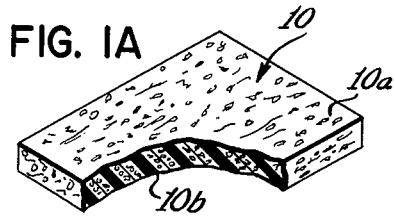
FIG. 1A shows a slab of a typical foam material.
Figure 1B:
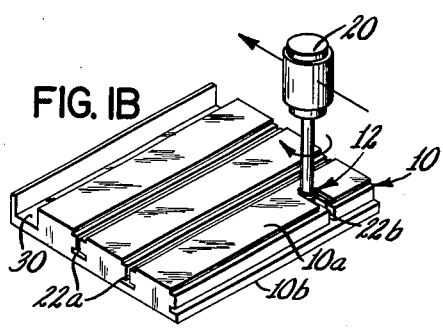
FIG. 1B through FIG. 1D represent diagrammatically the respective steps of grooving the foam, a cross section of a typical groove shape, and the filling of the grooves with a fluid plastic material.

Referring to the drawings, FIG. 1A shows a slab of plastic foam 10. A rigid foam plastic, such as foamed polyurethane, will satisfy the requirements of many applications.

Figure 1C:
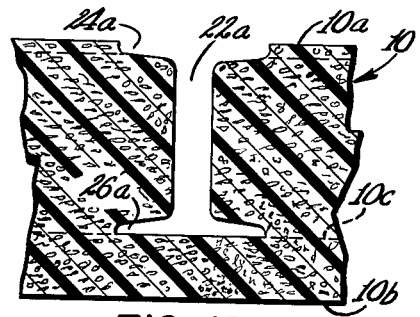
Figure 2:
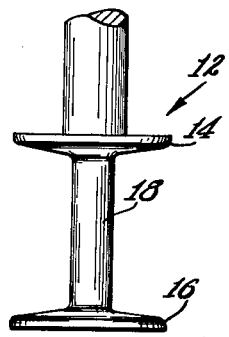
FIG. 2 is an elevational view of a typical cutting or routing tool used in the fabrication process of the present invention.

Typical rotary cutting tool 12 (FIG. 2) having two parallel cutting flanges 14 and 16 connected by straight cutting stem 18, is driven by motor 20. The cutting tool 12 is guided manually or automatically to produce the desired pattern of grooves 22a and 22b in the foam 10. While FIG. 1C illustrates a typical cross section in the form of an I-beam-shaped groove, such a configuration is not mandatory, the essential point being that the parallel top and bottom flange portions 24a and 26a of the groove should be relatively wide to provide a large bonding area.

Figure 1D:
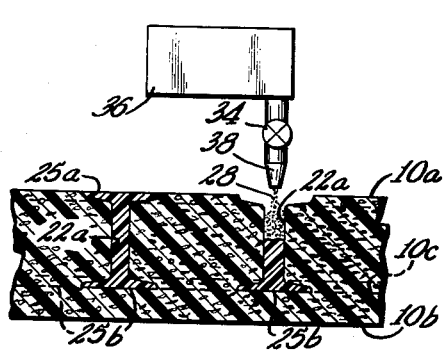

Grooves 22a and 22b are not cut the full depth of foam 10, being spaced from the foam bottom 10b at the level of 10c (FIG. 1D). The foam left between 10b and 10c serves as the bottom of the mold in which the rib casting takes place.

FIG. 1D schematically illustrates the infusion of fluid plastic 28 into the grooves 22a by means of nozzle 38 connected to reservoir 36 and provided with control valve 34. During the casting of the grid or network of ribs, a peripheral or marginal groove 30 (formed by a straight cutter) may also be filled with the liquid plastic to form a dense marginal area. Marginal or other high-density area 30 serves as a securing means for bolts, lugs, etc., as well as a stiffener.

After curing of the rib plastic, top surface 10a is trued, then the core is turned bottom up and the foam sliced off to a level of 10c, thereby truing the bottom and making it parallel with the top. Suitable adhesive is applied to the ribs after which the top and bottom facing sheets 32 (FIG. 3) are applied. The flat top and bottom surfaces 25a, 27a and 27a, 27b of the plastic ribs 29a and 29b provide a relatively large bonding surface with the facing sheets 32. The foam areas in the present invention correspond to the open cell areas of the prior art. However, a further advantage of the present invention is that there are no open areas. While this does not result in an appreciable gain in strength of the panel, it does provide a degree of soundproofing, heat insulation and moisture rejection capability.

In the present invention, the bonding surface can be made any percentage of the total sheet surface from 30 percent to 70 percent, as compared to 3 to 6 percent in the prior art for a core of equivalent density. As a result, for the present invention, there is an advantage structurally for any given weight per unit volume, as compared to sandwiches constructed in the prior art. Alternatively, for a sandwich panel of the same structural strength, a saving in weight can be gained by using a panel fabricated in accordance with the method of the present invention.

Figure 3:
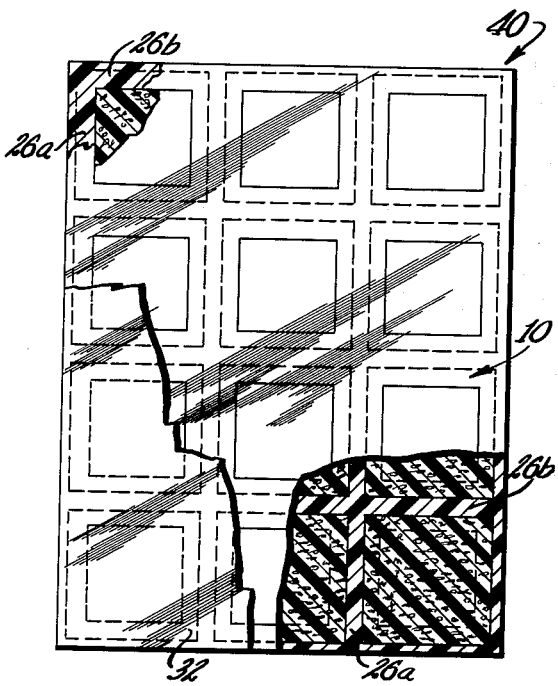
FIG. 3 is a plan view, partially broken away, of the finished panel.

FIG. 3 illustrates a finished panel 40 having a pattern of ribs 29a and 29b in a square configuration suitable for use with uniform loading. Where necessary, the rib pattern can be modified to increase the number of ribs per unit area as in 29a and 29c of FIG. 5. FIG. 6 illustrates still another pattern of ribs 29d which results in a high degree of structural rigidity.

FIG. 4 illustrates the attachment to a supporting I-beam member 46 of a sandwich fabricated in accordance with the present invention utilizing the high-density marginal or peripheral area 30. Fastening devices such as bolt 48 and nut 48a may be user in area 30 without danger of deforming the sandwich panel when tightening the nut.

Performance of a typical sandwich panel fabricated in accordance with the method of the present invention is given in this paragraph. The sandwich was comprised of a multiplicity of square grids of I-beam-shaped ribs of epoxy resin on 1-foot centers with a depth between internal surfaces of the facing sheets of 0.9 inch, the facing sheet being 0.050 inch thick laminated fiberglass, the total thickness of the panel being 1 inch. The density of the rib material was 76 lbs. per cu. ft. and that of the foam 2 lbs. per cu. ft. The edges of the sandwich panel were composed of a 2-inch band of high density epoxy plastic as shown by numeral 30 of FIG. 4.

With a 3-foot wide panel supported at its edges in a horizontal plane and with a uniform loading of 50 lbs. per square foot, the maximum deflection was but 0.1875 inch.

Presently, polyester epoxy resins are currently preferred although other filled or unfilled resins have suitable properties and may be employed.

The cover panels may be aluminum or other metal although at the present time glass-filled epoxy or polyester resin is preferred.

There has thus been disclosed a completely closed volume honeycomb sandwich panel wherein a low cost, lightweight core may be stiffened by casting techniques. By proper material selection, the finished product is nonflammable. Additionally, it is portable and is adaptable to a variety of applications.

There has been disclosed heretofore the best embodiment of the invention presently contemplated and it is to be understood that various changes and modifications may be made by those skilled in the art without departing from the spirit of the invention.

What is claimed is:

1. The method of forming a multilayered structural panel comprising the steps of:
   (a) forming a first plurality of spaced grooves in a foam plastic mold member, the grooves extending inwardly from a first planar mold surface to a depth less than the total thickness of the mold member the grooves each having a first relatively thin midportion disposed within the thickness dimension of the mold and second and third end portions perpendicular to and substantially wider than the first portion, the second groove portion being formed flush with the first surface of the mold member at one end of the first portion of the grooves, the third groove portion being formed at the opposite end of the first groove portion;
   (b) filling the grooves with a plastic substantially denser than the mold member;
   (c) removing material from the surface of the mold member opposite the grooved surface to the depth of the denser plastic disposed in the grooves whereby the denser plastic extends throughout the thickness of the mold member to provide continuous reinforcing; and
   (d) securing a facing sheet to the grooved surface and the opposite surface.

2. The method of claim 1 including forming a second plurality of grooves in said mold member, the second plurality of grooves extending from one surface of the mold member to a depth less than the mold member in a plane perpendicular to the plane of the first plurality of grooves.

3. The method of claim 1 including the step of forming a marginal groove about the periphery of the mold member.

4. The method of claim 1 including the step of truing the surface of the mold member prior to the step of securing the facing sheets.

5. The method of claim 1 including the step of applying an adhesive to the mold member surface prior to the step of securing the facing sheets.

6. The method of claim 3 including the step of securing a supporting member to the periphery of the mold member after the marginal groove is formed and filled.

References Cited by the Examiner

UNITED STATES PATENTS

| | | | |
|---|---|---|---|
| 1,531,983 | 3/25 | Sawyer | 156—257 X |
| 2,460,309 | 2/49 | Rapp | 161—38 |
| 2,791,264 | 5/57 | Couse | 161—94 X |
| 2,826,521 | 3/58 | Robinson | 161—57 |
| 2,837,455 | 6/58 | Wolf | 161—121 X |
| 2,999,043 | 9/61 | Glynn | 161—118 X |
| 3,016,578 | 1/62 | Rohe | 18—59 |
| 3,016,580 | 1/62 | Jaeschke | 18—59 |
| 3,078,948 | 2/63 | Gildard et al. | 161—113 |

ALEXANDER WYMAN, *Primary Examiner.*

MORRIS SUSSMAN, *Examiner.*